United States Patent Office 3,086,861
Patented Apr. 23, 1963

3,086,861
PRINTING PLATES COMPRISING INK RECEPTIVE AZO DYE SURFACES
Peter T. Woitach, Jr., Binghamton, and Clifford E. Herrick, Jr., Chenango Forks, N.Y., assignors to General Aniline & Film Corporation, New York, N.Y., a corporation of Delaware
No Drawing. Filed July 1, 1960, Ser. No. 40,186
9 Claims. (Cl. 96—33)

This invention relates to printing plates used in photomechanical reproductions and to particular coupling compounds for use therein. More particularly, this invention relates to a printing plate for photomechanical reproduction in which the ink-receptive surface is an azo dye formed by the reaction of a monofunctional quinone diazide and a coupling component of the general formula:

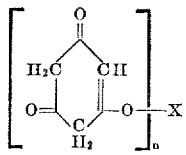

wherein X is a group serving to link two nuclei of the coupler together as, for example, —CH$_2$—CH$_2$—, —CH$_2$CH$_2$CH$_2$—, —CH$_2$CH$_2$CH$_2$CH$_2$— or

—CH$_2$CH$_2$OCH$_2$CH$_2$— and $n$ is 2.

The use of azo dyes as ink-receptive lithographic images for direct positive offset plates has been suggested before. French Patent 904,255 discloses a process for preparing printing plates on aluminum whose surface has been rendered more or less porous and wettable by chemical or mechanical means. The surface thus prepared is coated with an aqueous solution containing a low-molecular-weight diazo compound whose photoproduct can be removed by washing, a low-molecular-weight coupling component, and a stabilizing acid. After exposing the coated plate beneath a positive original, the azo dye image is developed with ammonia fumes and the plate is washed with water to remove the residual material in the light struck areas.

In this same patent there is also disclosed the use of water-insoluble diazooxides, specifically the ethyl ester of 2-diazo-1-naphthol-5-sulfonic acid, for producing positive-working photoplates on porous aluminum without recourse to the use of coupling components. In this case, the diazo compound is itself more or less ink-receptive, and, after exposure as above and removal of the photoproduct by washing with water, serves as the printing image.

The dyes formed using the diazo compound and coupling component as above are lacking in ink-receptivity, are friable, and have a limited life on the press. In order to prevent precoupling, it is necessary to add an acid, such as tartaric acid, to the layer and under such circumstances the image appears to become honeycombed and is especially friable and weak. The plates prepared with the diazooxide mentioned above are likewise of limited use since the ink-receptive diazo image suffers under printing conditions on the offset press.

German Patents Nos. 875,437 and 893,748 disclose the use of water-insoluble diazooxides derived from amides or esters of the sulfonic acids of 1,2-aminonaphthols and 1,2-aminophenols in conjunction with low-molecular-weight coupling components as above. German Patent No. 854,890 discloses the use of similar diazooxides without coupling components. The processes as disclosed in these patents are based directly upon the earlier French patent cited above, differing only in an increase of the molecular weight of the diazooxides used, and in the use of an alkaline after-treatment following exposure to remove the photoproduct from the exposed areas and render these areas water-receptive.

Difficulties with the methods described above are encountered when an attempt is made to utilize a hydrophilic colloid, e.g., surface-saponified cellulose acetate, PVM/MA or a colloid-bound porous clay as an image carrier in the production of direct positive lithographic images. Such underlayers are especially interesting commercially since the primary support may be an inexpensive wet strength paper. We have found that when such layers are used, it is of first importance that the image be maintained in an essentially undiluted form in the very top surface region of the carrier layer. Almost the slightest degree of penetration of the image into the hydrophilic underlayer and the consequent dilution of its ink-receptive character which inevitably occurs, result in a marked falling off in the ability of the image to pick up ink; if the photoproduct is ink-receptive or prone to tan, a negative image frequently will result in place of the expected positive image. In the case of water-soluble diazos used together with a coupler, penetration may be extreme and if the diazo component is sufficiently large, a negative image results due to tanning, and a very poor ink-receptivity in the dye-containing areas is produced. When very large water-insoluble diazooxide molecules of high-molecular-weight are used on a water-receptive colloid substratum, great difficulty is frequently encountered in removing the ink-receptive photodecomposition product, with the result that the plate is very likely to show tone in the non-image areas, since the alkaline after-treatment heretofore employed for such diazooxide layers is not sufficiently effective in removing all of the photodecomposition products. Furthermore, many colloids are badly damaged by the alkaline developing treatment. If an attempt is made to utilize the ink-receptive azo dye image in conjunction with a colloid underlayer and a water-insoluble diazo, it is frequently found that the coupler components heretofore used tend to migrate into the colloid and away from the diazo to the point that the shelf-storage life of the plate under moist conditions is unsatisfactory since no image will be formed after short aging. Furthermore, as discussed below, some of the couplers of great potential utility are prone to cause a premature over-all hardening of the hydrophilic substrate if the coupler molecule penetrates into the hydrophilic underlayer with the result that an over-all tone may occur.

In order to produce an ink-receptive dye image of good mechanical strength and a high degree of ink-receptivity, it is important that the dye molecule have a high molecular weight. Such dyes can be produced if a coupler molecule is capable of coupling more than once. Thus phloroglucinol would be expected to be a desirable coupling component since this molecule can couple three times to produce a multi-dimensional dye molecule of considerable size and molecular weight. However, with an underlayer which consists of a mixture of cellulose acetate and a maleic anhydride copolymer, it is found that plates coated with phloroglucinol penetrate the colloid underlayer upon aging and a marked increase in the ink-receptivity of the amidified underlayer occurs.

It is an object of this invention to provide a printing plate suitable for use in photomechanical reproduction in which the image is composed of a tough dye of high molecular weight by the use of diazo compounds of relatively low molecular weight.

It is a further object of this invention to provide a printing plate suitable for use in photomechanical reproduction having a colloid layer thereon and a coating of dye components on the surface of said layer, which components do not penetrate said layer when placed thereon or upon aging.

A still further object of this invention is to provide a printing plate suitable for use in photomechanical reproduction having an underlayer of colloidal material thereon of a type which is initially sensitive to the solvent or solvents used to dissolve the dye component or components coated on said layer to obtain a good bond between the underlayer and said dye components.

Another object of this invention is to provide a printing plate suitable for use in photomechanical reproduction having an underlayer thereon of colloidal material which, after exposure of the plate, has the property of becoming water receptive in the non-image areas when the plate is subjected to a chemical reagent which will bring about coupling between the residual diazo and the coupler component coated on said underlayer.

Still another object of this invention is to provide novel coupling compounds suitable for use in a printing plate used in photomechanical reproduction.

Other objects and advantages of this invention will become apparent to those skilled in the art from the detailed description thereof given below.

The objects and advantages of our invention are accomplished by coating a solution comprising a monofunctional quinone diazide and a coupling component having the general formula:

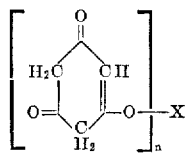

wherein X is a group serving to link two or more molecules of the coupler together as, for example, —CH₂—CH₂—, —CH₂CH₂CH₂—,

—CH₂CH₂CH₂CH₂— or —CH₂CH₂OCH₂CH₂— and $n$ is 2, onto a resinous surface which is hydrophobic and ink-receptive, but which has the property of becoming hydrophilic and ink-repellent when subjected to the action of a chemical reagent such as an amine base, for example, which will cause dye formation between the diazo and the coupler, exposing the light-sensitive layer thus formed to light beneath a positive original and developing the exposed layer by means of a developing agent such as ammonia, for example, to cause coupling and dye formation in the portion of the layer not exposed to light. At the same time, the portions of the resinous surface not covered by the ink-receptive dye become water-receptive and grease-repellent due to the action of the developing agent thereon. The photodecomposition products and unused coupler are then removed from the non-image area by the use of an appropriate treating solution.

Coupling components contemplated for use herein and falling within the above formula are:

(1) Ethylene dioxy-5,5'-diresorcinol of the formula

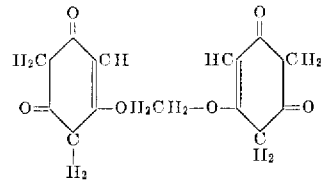

(2) Propylene dioxy-5,5'-diresorcinol
(3) Butylene dioxy-5,5'-diresorcinol
(4) Diethylene oxide dioxy-5,5'-diresorcinol of the following formula:

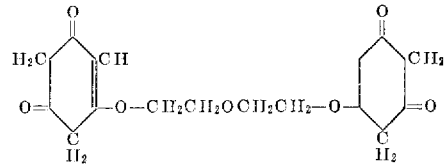

The resinous surface may be formed of a resin comprising a mixture of a low-molecular-weight cellulose acetate and a copolymer of maleic anhydride and a vinyl alkyl ether such as ethyl vinyl, butyl vinyl, isobutyl vinyl, 2-chloroethyl vinyl, 2-methoxyethyl vinyl or methyl vinyl ether. The copolymer of maleic anhydride with methyl vinyl ether will hereafter be designated PVM/MA for the sake of brevity. The relative proportions of cellulose acetate and copolymer in the mixture may be varied within wide limits such as from 1 copolymer:3 cellulose acetate to 3 copolymer:1 cellulose acetate. We prefer to use a resinous layer of PVM/MA in which the copolymer is present in amounts ranging from 45% to 55% of the total solids.

The following examples illustrate the method of preparing and using our novel photomechanical plate and the methods used in preparing our novel coupling compounds. It is to be understood, however, that these examples are given by way of illustration and not by way of limitation.

*Example I*

This example shows a method of preparing the ethylene-dioxy-5,5'-diresorcinol.

A mixture of 20 g. (0.124 mole) of phloroglucinol dihydrate, 4.2 g. (0.068) of ethylene glycol, a few drops of concentrated sulfuric acid and 30 ml. of dry xylene were heated with stirring for about two hours at 106°–125° C. The reaction mixture was allowed to cool and most of the xylene was decanted off. The solidified brown-colored product was taken out of the flask and traces of xylene and sulfuric acid which remained in the mixture were removed under vacuum. The dried crude produce crystallized from water (charcoal) to yield 5 g. (23% of theoretical) of white crystalline powder melting at 280–2° (uncorrected).

*Analysis.*—Calculated for $C_{14}H_{14}O_8$: C, 60.50; H, 5.04. Found: C, 60.78, 60.74; H, 4.69, 4.63.

The compound diethyleneoxidedioxy-5,5-diresorcinol is prepared in the same manner by using diethylene glycol instead of ethylene glycol in the above reaction.

Propylenedioxy 5,5'-diresorcinol and butylenedioxy-5-5'-diresorcinol are prepared by replacing the ethylene glycol in the above reaction with propylene glycol and butylene glycol respectively.

*Example II*

This example shows a method of preparing the diazo compound N-(m - 2 - dioxolanylphenyl)-6(5)-diazo-5(6)-oxo-1-naphthalenesulfonamide.

(1) The starting compound for the preparation of the above cyclic diazo was m-nitro-benzaldehyde ethylene glycol acetal. This starting compound was prepared according to L. F. Fieser, M. Fields, and S. Liebermann (J. Biol. Chem. 156, 191–201 (1944); C.A. 39: 724[2] (1945).

(2) A solution of 334 g. (0.171 mole) of m-nitrobenzaldehyde ethylene glycol acetal in 200 ml. of isopropyl alcohol was shaken at about 45° C. with hydrogen and platinum oxide. After two hours and twenty minutes approximately the theoretical amount of hydrogen had been absorbed and the catalyst was removed by filtration. The solution of m-aminobenzaldehyde ethylene glycol acetal was used in the next step without further purification.

(3) 14 g. of naphthalene-2,1-diazooxide - 5 - sulfonic acid was added portionwise to 100 ml. of chlorosulfonic acid, adding Dry Ice as needed to maintain the temperature at 30–45° C. After addition of all solid was completed, the reaction mixture was drowned in ice-water, the solid separated in a centrifuge, washed neutral with water, and dried in vacuo over sodium hydroxide. Yield=9.85 g. If desired, the crude product thus obtained may be purified by recrystallizing from benzene.

(4) A mixture of the solution from (2), 22.6 g. of potassium carbonate, and 43 ml. of water was cooled to 0–10° C. To the stirred mixture a warm solution of 45.0 g. of recrystallized 6(5)-diazo - 5(6) - oxo-1-naphthalenesulfonyl chloride (prepared as in (3)) in 165 ml. of dioxane was added dropwise over forty minutes. The mixture was then warmed to 25° C. and stirred at this temperature for three hours. It was then poured into about 1200 ml. of stirred ice water. The yellow solid which precipitated was collected by filtration and treated with 900 ml. of water and 10 ml. of sodium hydroxide. Insolubles were removed by filtration and the product was precipitated with 30 ml. of concentrated hydrochloric acid. A second extraction of the alkali-insoluble material with aqueous sodium hydroxide followed by filtration and acidification gave additional product which was combined with the first fraction. The product was filtered, washed with water, and dried under reduced pressure. The yield was 41.4 g. of material which melted at 93–99° C.

*Example III*

This example shows a method of preparing the diazo compound N-methyl (naphthalene - 2,1 - diazooxide-5-sulfonanilide).

22 g. of naphthalene - 2,1 - diazooxide-5-sulfonyl chloride was dissolved in 500 ml. methanol. To this was added a solution of 18 ml. of N-methylaniline in 100 ml. of methanol, and the mixture refluxed for three hours. After cooling to room temperature, the solid which separated was filtered, and recrystallized from methanol. Yield=8.7 g. of reddish crystals, melting at 145°–147° C. with decomposition.

*Example IV*

This example shows a method of preparing the diazo compound phenyl naphthalene-2,1-diazooxide - 5 - sulfonate.

13.0 g. of naphthalene - 2,1 - diazooxide-5-sulfonyl chloride and 4.7 g. of phenol were dissolved in 100 ml. of dioxane, heated to 50–60° C., and 20 ml. of 3 N-Na$_2$CO$_3$ were added dropwise. Heating was continued for ½ hour after addition was complete. The reaction mixture was allowed to cool and to stand overnight. Upon pouring into water, an oil separated, which crystallized after standing a short time. The product was recrystallized from isopropanol. Yield=8.5 g.

The following three examples show methods of preparing printing plates according to our invention:

*Example V*

A high wet strength kraft paper, bearing on one side a formaldehyde-hardened, pigmented casein layer, was coated on the casein-bearing side with a lacquer dope of the following composition:

2.5 parts PVM/MA (specific viscosity=3.0)
2.75 parts cellulose acetate (55–56% combined acetic acid)
90 parts acetone
10 parts methyl Cellosolve and dried.

Coating conditions were adjusted so that the resulting dry film thickness was between .0001 and .0002 inch.

The dried lacquered paper thus prepared was bead-coated with a solution of the following composition:

3.75 g. N-(m-2-dioxolanylphenyl) - 6(5) - diazo-5(6)-oxo-1-naphthalene-sulfonamide
3.75 g. ethylenedioxy-5,5'-diresorcinol
32 ml. toluene
63 ml. ethanol
5 ml. dioxane After thorough drying the light-sensitive plate was exposed beneath a positive original to the radiation of a mercury or carbon arc, the diazo compound under the non-image portions of the original thereby being bleached out. The exposed plate was then subjected to the action of moist ammonia fumes, whereupon a very deep brown, almost black, positive image was obtained. At the same time the non-image portions were found to have been rendered water-receptive. The developed plate is next treated with a solution containing:

85 parts water
5 parts ethylene glycol
10 parts sodium chloride

After a brief treatment with dilute acid, such as 1% aqueous phosphoric acid, the plate was ready for printing.

*Example VI*

The procedure followed in this example was the same as Example V except that N-methyl (naphthalene-2,1-diazooxide-5-sulfonanilide) was used as the diazo compound and diethyleneoxidedioxy - 5,5' - diresorcinol was used as the coupling component.

*Example VII*

The procedure followed in this example was the same as that of Example V except that phenyl naphthalene-2,1-diazooxide-5-sulfonate was used as the diazo compound and butylenedioxy-5,5'-diresorcinol was used as the coupling component.

Compounds containing two phloroglucinol nuclei per molecule are known. All of these known compounds, however, have a carbon to carbon linkage. In the coupling compounds of our invention, on the other hand, the phloroglucinol nuclei are linked through oxygen atoms. This type of linkage causes no appreciable depression of the coupling activity of the compound and leaves all coupling positions open. This is not true of the known compounds having a carbon to carbon linkage.

Our invention is not limited to the detailed description thereof contained herein, but includes all modifications that fall within the scope of the appended claims.

We claim:

1. A light-sensitive element for producing a printing plate having a base, a coating thereon selected from the class consisting of a cellulose acetate, a copolymer of a vinyl ether and maleic anhydride and a colloid bound porous clay, said coating being over-coated with a mixture of a monofunctional quinone diazide and a coupling compound having the following chemical formula:

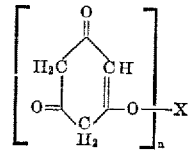

wherein X is selected from the group consisting of

—CH₂—CH₂—, —CH₂CH₂CH₂—
—CH₂CH₂CH₂CH₂—, —CH₂CH₂OCH₂CH₂— and *n* is 2 said quinone diazide and coupling component being capable of coupling in the presence of an alkali to yield a greasy ink receptive azo dye.

2. The element as defined in claim 2 in which the outer coating comprises a mixture of n-(m-2-dioxolanyl-phenyl)-6(5)-diazo-5(6)-oxo-1-naphthalene sulfonamide and ethylenedioxy-5,5'-diresorcinol.

3. The element as defined in claim 2 in which the outer coating comprises a mixture of n-methyl(naphthalene-2,1-diazooxide-5-sulfonanilide) and diethylene-oxidedioxy-5,5'-diresorcinol.

4. The element as defined in claim 2 in which the outer coating comprises a mixture of phenyl naphthalene-2,1 - diazooxide - 5 - sulfonate and butylenedioxy-5,5'-diresorcinol.

5. A light-sensitive element for producing a printing plate comprising a base, a resinous layer comprising a mixture of cellulose acetate and a copolymer of polyvinyl methyl ether and maleic anhydride on said base, said layer having a coating thereon comprising a mixture of a light-sensitive monofunctional quinone diazide and a coupling compound having the following chemical formula:

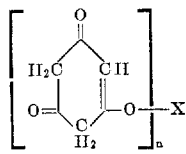

wherein X is selected from the group consisting of

—CH₂—CH₂—, —CH₂CH₂CH₂—
—CH₂CH₂CH₂CH₂— and —CH₂CH₂OCH₂CH₂— and *n* is 2 said quinone diazide and coupling component being capable of coupling in the presence of an alkali to yield a greasy ink receptive azo dye.

6. A light-sensitive element, for producing a printing plate comprising a base, a resinous layer comprising a mixture of cellulose acetate and a copolymer of polyvinyl methyl ether and maleic anhydride on said base, said layer having a coating thereon comprising a mixture of N-(m-2-dioxolanylphenyl)-6(5)-diazo-5(6)-oxo-1-naphthalene-sulfonamide and ethylenedioxy-5,5'-diresorcinol said mixture being capable of coupling in the presence of an alkali to produce a greasy ink receptive azo dye.

7. A light-sensitive element for producing a printing plate comprising a base, a resinous layer comprising a mixture of cellulose acetate and a copolymer of polyvinyl methyl ether and maleic anhydride on said base, said layer having a coating thereon comprising a mixture of N-methyl(naphthalene-2,1 - diazooxide-5-sulfonanilide) and diethyleneoxidedioxy-5,5'-diresorcinol said mixture being capable of coupling in the presence of an alkali to produce a greasy ink receptive azo dye.

8. A light-sensitive element for producing a printing plate comprising a base, a resinous layer comprising a mixture of cellulose acetate and a copolymer of polyvinyl methyl ether and maleic anhydride on said base, said layer having a coating thereon comprising a mixture of phenyl naphthalene-2,1 - diazooxide-5 - sulfonate and butylenedioxy-5,5'-diresorcinol said mixture being capable of coupling in the presence of an alkali to produce a greasy ink receptive azo dye.

9. A process of making a printing plate suitable for use in photomechanical reproduction comprising coating a base with a solution comprising a resinous mixture of a cellulose ester and a copolymer of polyvinyl alkyl ether and maleic anhydride, dissolved in a solvent medium for said mixture, drying said coating to form a layer of said resinous mixture on said paper, coating said layer with a solution comprising a mixture of a light-sensitive monofunctional quinone diazide and an azo coupling compound consisting of at least two phloroglucinol nuclei linked together through oxygen atoms joined to an alkylene group, drying said coating, exposing to radiation the thus coated paper beneath a pattern whereby the monofunctional quinone diazide under the non-image portions of the original is bleached out, developing the exposed paper with moist ammonia fumes, whereby the non-image portions of the coated papers are rendered water receptive and a positive dye image is produced in the non-exposed areas and treating the developed paper with a solution capable of removing the photodecomposition products therefrom.

References Cited in the file of this patent

UNITED STATES PATENTS

| | | |
|---|---|---|
| 1,444,469 | Kogel et al. | Feb. 6, 1923 |
| 2,500,099 | Straley | Mar. 7, 1950 |
| 2,772,972 | Herrick et al. | Dec. 4, 1956 |
| 2,854,338 | Herrick et al. | Sept. 30, 1958 |
| 2,940,852 | Herrick et al. | June 14, 1960 |

FOREIGN PATENTS

| | | |
|---|---|---|
| 706,028 | Great Britain | Mar. 24, 1954 |

UNITED STATES PATENT OFFICE
CERTIFICATE OF CORRECTION

Patent No. 3,086,861                  April 23, 1963

Peter T. Woitach, Jr., et al.

It is hereby certified that error appears in the above numbered patent requiring correction and that the said Letters Patent should read as corrected below.

Column 4, lines 6 to 14, the formula should appear as shown below instead of as in the patent:

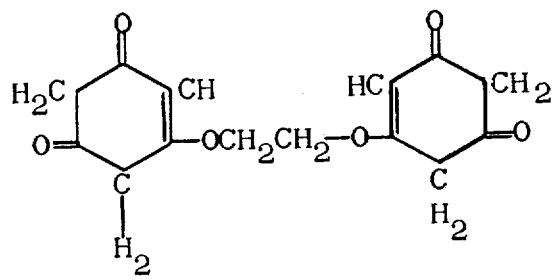

column 5, line 6, for "334 g." read -- 33.4 g. --; column 8, line 35, for "papers" read -- paper --.

Signed and sealed this 24th day of December 1963.

(SEAL)
Attest:
ERNEST W. SWIDER

Attesting Officer

EDWIN L. REYNOLDS
Acting Commissioner of Patents